April 14, 1936.  J. PYMM  2,037,534
VEHICLE JACK
Filed April 13, 1935  2 Sheets-Sheet 1
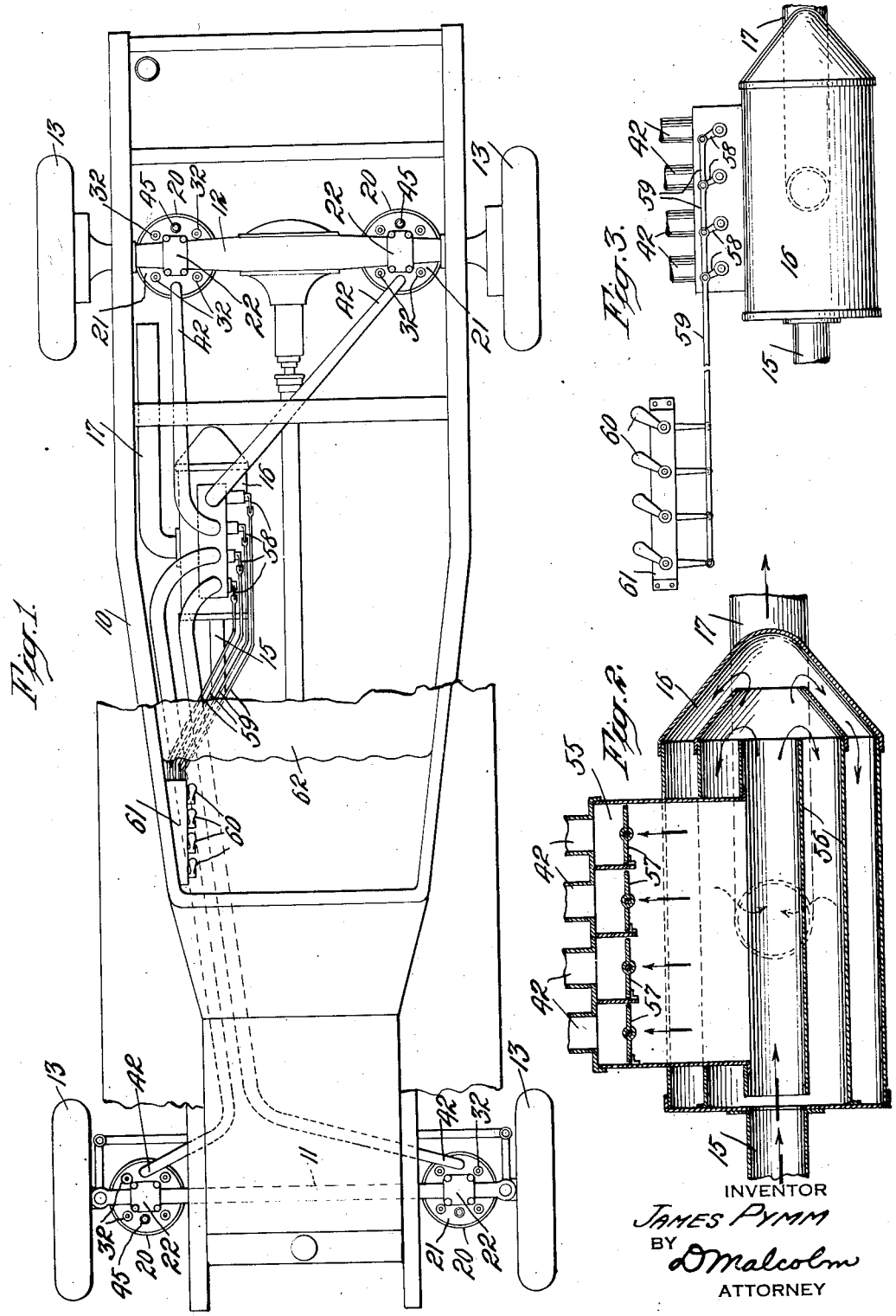
INVENTOR
JAMES PYMM
BY D. Malcolm
ATTORNEY

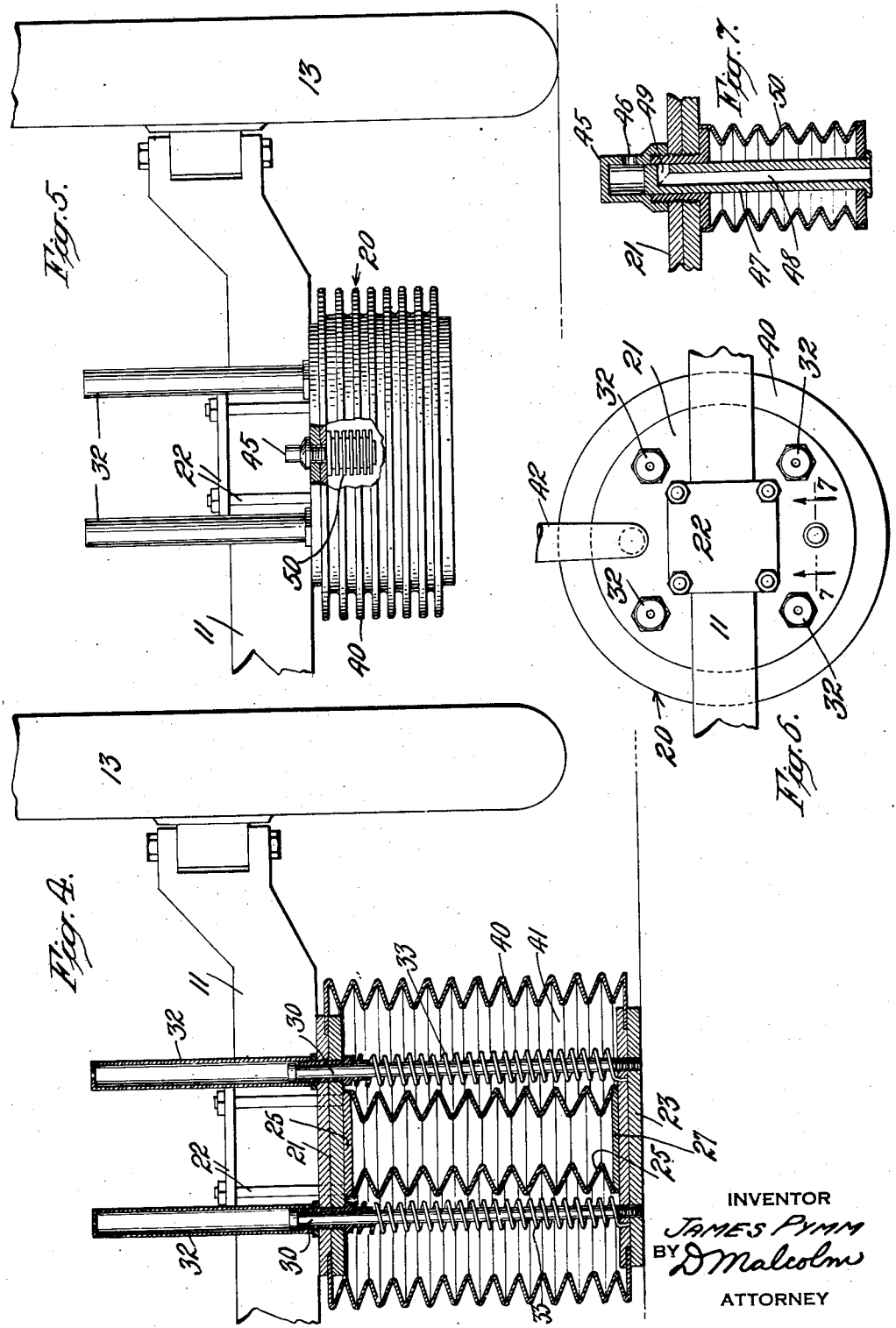

Patented Apr. 14, 1936

2,037,534

UNITED STATES PATENT OFFICE 2,037,534

VEHICLE JACK

James Pymm, Brooklyn, N. Y.

Application April 13, 1935, Serial No. 16,138

15 Claims. (Cl. 254—86)

This invention relates to a jack for automobiles and the like and more particularly to an automatic jack adapted to be operated by power supplied from the automobile engine.

An object of the invention is to provide an efficient, practical and dependable device of the type above indicated.

In accordance with the present invention, separate jacks are permanently secured to the axles of the automobile at points near the various wheels, so that each jack, when operated, is adapted to raise one of the wheels from the ground. In one embodiment each jack consists of an expansible bellows containing a volatile substance such as ether, which is capable when heated to a temperature below that of the automobile exhaust, of exerting a force sufficient for the above purpose. The automobile exhaust gases are used for heating the volatile substances, suitable controls being provided for supplying the exhaust gases to the various jacks as required.

Other features of the invention consist in the various details of construction and combinations of parts hereinafter more fully set forth.

Although the various novel features which are believed to be characteristic of this invention will be more particularly pointed out in the claims appended hereto, the invention itself, as to its objects and advantages and the manner of its operation, may be better understood by referring to the following description, taken in connection with the accompanying drawings forming a part thereof, in which:

Fig. 1 is a plan view of an automobile chassis illustrating one embodiment of the present invention;

Fig. 2 is a longitudinal section through the muffler showing the manifold for controlling the passage of exhaust gases to the various jacks;

Fig. 3 is a detail view showing the manual control means associated with the manifold of Fig. 2;

Fig. 4 is a section through a jack constructed in accordance with this invention, showing the same in extended position for raising a wheel;

Fig. 5 is a side elevation of the jack in contracted position, partly broken away to show the control valve;

Fig. 6 is a top plan view of the bellows showing the same secured to an axle of the automobile; and Fig. 7 is a section on the line 7—7 of Fig. 6 showing the construction of the control valve.

In the following description and in the claims various details have been referred to by specific terms for convenience. These terms, however, are to be given as broad an interpretation as the state of the art will permit.

Referring to the drawings more in detail, the invention is shown in Fig. 1 as applied to an automobile having a chassis 10 of standard construction and having a front axle 11 and a rear axle 12 secured thereto in any convenient manner and carrying the usual set of wheels 13. The chassis is adapted to support a source of motive power such as an internal combustion engine, not shown, the exhaust of which is connected by means of a pipe 15 to a muffler 16 having an outlet or exhaust pipe 17. The muffler 16 is of standard construction and only so much thereof has been disclosed as is necessary to an understanding of the present invention.

Jacks 20 are shown as secured to the front and rear axles 11 and 12, near the front wheels 13, so that each jack is adapted to lift one wheel from the ground. Obviously the jacks may be placed in other locations if desired and their operation may be modified accordingly.

One of the jacks 20 is shown more in detail in Figs. 4 to 6, as comprising a top plate 21 which may be firmly secured to the bottom of an axle such as the front axle 11 by a suitable clamp 22, and a bottom plate 23 which is adapted to engage the ground or other supporting surface when the jack is operated for lifting the wheel. An expansible bellows 25 is provided with a top plate 26 and a bottom plate 27, which are secured to the plates 21 and 23, respectively, so that the position of the plate 23 relative to the automobile axle 12 is determined by the position of the bellows 25. The bellows 25 may contain a volatile substance such as ether or the like, which is capable, when heated to a temperature at or below the temperature of the exhaust gases, of exerting sufficient pressure for expanding the bellows 25 and lifting the selected part of the automobile such as the adjacent wheel 13.

For preventing lateral movement of the bottom plate 23 with respect to the top plate 21, guide rods 30 are provided which may be secured to the bottom plate 23 and may telescope within tubes 32 which may be rigidly secured to the top plate 21 in any convenient manner. Suitable springs 33 may be associated with the rods 30. These springs may be secured to the plates 21 and 23 and held under sufficient tension to insure the smooth operation of the device and to maintain the bellows in collapsed condition when operation thereof is not desired.

A flexible casing 40, extending around the bellows 25 to form a chamber 41 concentric therewith, may be secured between the plates 21 and 23. Exhaust gases may be supplied to this chamber by a pipe 42 (Fig. 6) and the operation thereof may be controlled by a control valve of the type illustrated in Fig. 7 and comprising a cap 45 mounted upon the plate 21 and having a vent 46 which is adapted to vent the chamber 41 to the atmosphere. A plunger 47 is slidably mounted within the cap 45 and is provided with an internal bore 48 which communicates at one end with the chamber 41 and at the other end connects with a transverse bore 49 which is adapted to be brought into alignment with the vent 46 when the plunger 47 is in elevated position. When the plunger 47 is in its lower position the transverse bore 49 is out of alignment with the vent 46, thereby closing the passage between the chamber 41 and the atmosphere.

For operating the plunger 47 there may be provided an expansible bellows 50 which is positioned within the chamber 41 and may contain an expansible fluid, whereby the bellows 50 is caused to expand and contract in accordance with the temperature of the chamber 41.

The pipes 42 which lead to each of the jacks 20 are connected to a manifold 55 which is mounted in the muffler 16 in a position to receive gases from a point near the intake thereof and before the gases have passed around the various baffles 56 within the muffler prior to discharge through the exhaust pipe 17. The opening to each of the pipes 42 may be controlled by butterfly valves 57. Each valve 57 may be operated by an arm 58 which may be connected by a link 59 to a lever 60. A separate lever 60 is thus provided for each of the butterfly valves 57. The set of levers 60 may be mounted on panel 61 in a convenient position for operation by the driver of the automobile as, for example, at the side of the chassis 10 and in front of the driver's seat 62.

In the operation of this device the bellows 25 is normally collapsed, causing the jack 20 to be elevated from the ground and to lie closely adjacent the axle of the automobile as illustrated in Fig. 5. In this position the valve plunger 47 is elevated and the transverse bore 49 is in alignment with vent 46 whereby the chamber 41 is vented to the atmosphere. When it is desired to operate one of the jacks for lifting a wheel of the automobile, one of the levers 60 is actuated to open the corresponding butterfly valve 57 and to cause exhaust gases to pass from the muffler 16 to the chamber 41 of the selected jack. Heat is thus supplied, due to the passage of the hot gases through the chamber 41, around the bellows 25 and out of the vent 46, until the substance within the bellows 25 expands and exerts a pressure sufficient to expand the bellows 25 and to lift the wheel from the ground.

In order to avoid developing an excess pressure within the bellows 25, the flow of gases is interrupted at a predetermined point by expansion of the bellows 50 which closes the vent 46, thereby retaining the hot gases within the chamber 41 and building up a sufficient back pressure to prevent further gases from being supplied thereto. It will be noted that the passage from the muffler 16 to the exhaust pipe 17 remains open at all times so that the exhaust gases can pass through the muffler and out of the exhaust pipe 17 when the butterfly valves 57 are all closed or when a sufficient back pressure is built up in the manner above mentioned to prevent further flow of gases to a selected jack.

It is obvious that the position of the plunger 47 with respect to the vent 46 may be adjusted to control the flow of hot gases through the chamber 41 so as to maintain the substance within the bellows 25 at the required temperature as long as a butterfly valve 57 is open. When the gases within the chamber 41 cool below the predetermined temperature the bellows 50 contracts, thereby establishing a connection between the vent 46 and the chamber 41 and permitting further quantities of exhaust gases to be supplied to said chamber until the temperature thereof is again raised to the predetermined point.

It is to be noted that any or all of the wheels may be elevated at the same time by suitable operation of the levers 60 and that the wheels will remain elevated so long as the engine remains running and hot gases are supplied from the muffler 16. This operation is entirely automatic and without manual effort on the part of the driver.

Although a certain specific embodiment of the invention has been shown for purposes of illustration, it is obvious that various changes and modifications may be made therein without departing from the scope of the invention which is to be limited only in accordance with the following claims when interpreted in view of the prior art.

The invention claimed is:

1. In a motor driven vehicle having a source of motive power, a jack comprising an expansible bellows containing a volatile substance, and means to supply heat derived from said source of motive power to said substance for vaporizing the same.

2. In a motor driven vehicle having a high temperature exhaust, a jack comprising an expansible bellows containing a volatile substance adapted, when heated to a temperature below that of the exhaust, to exert pressure sufficient to lift at least a portion of said vehicle, and means for passing exhaust gases in heat exchange relationship with said substance.

3. In a motor driven vehicle having a high temperature exhaust, a jack permanently secured to an axle of said vehicle, said jack comprising an expansible bellows containing a volatile substance adapted, when heated to a temperature below that of the exhaust, to exert pressure sufficient to lift at least a portion of said vehicle, and means for passing the exhaust gases in heat exchange relationship with said substance.

4. In a motor driven vehicle having a high temperature exhaust, a jack permanently secured to an axle of said vehicle, said jack comprising an expansible bellows containing a volatile substance adapted, when heated to a temperature below that of the exhaust, to exert pressure sufficient to lift at least a portion of said vehicle, means forming a chamber in heat exchange relationship with said bellows, and means for supplying the exhaust gases to said chamber for causing actuation of said jack.

5. In a motor driven vehicle having a high temperature exhaust, a jack permanently secured to an axle of said vehicle, said jack comprising an expansible bellows containing a volatile substance adapted, when heated to a temperature below that of the exhaust, to exert pressure sufficient to lift at least a portion of said vehicle, means forming a chamber in heat exchange relationship with said bellows, means for supplying the exhaust gases to said chamber for causing actuation of said jack, a vent for venting said chamber to the atmosphere and a thermal-controlled valve for said vent adapted to control the passage of gases therethrough in accordance with the heat requirements of said substance.

6. In a motor driven vehicle having a high temperature exhaust, a jack permanently secured to an axle of said vehicle, said jack comprising an expansible bellows containing a volatile substance adapted, when heated to a temperature below that of the exhaust, to exert pressure sufficient to lift at least a portion of said vehicle, a flexible member concentric with said bellows and forming a chamber in heat transfer relationship therewith, means to supply exhaust gases to said chamber, a vent for said exhaust gases, and a temperature responsive valve adapted to control the opening of said vent in accordance with the heat requirements.

7. In a motor driven vehicle having wheels and a high temperature exhaust, an automatic jack secured in operative relationship with each of said wheels, said jack being operable in response to heat supplied from said exhaust, a manifold associated with said exhaust and connected to the various jacks, and valves adapted to independently control the flow of gases from said manifold to each of said jacks.

8. In a motor driven vehicle having wheels and a high temperature exhaust, an automatic jack secured in operative relationship with each of said wheels, said jack being operable in response to heat supplied from said exhaust, a manifold associated with said exhaust and connected to the various jacks, valves adapted to independently control the flow of gases from said manifold to each of said jacks, and means readily accessible to the operator of the vehicle for selectively actuating said valves.

9. In a motor driven vehicle having running wheels and a high temperature exhaust including a muffler, a jack operatively associated with each wheel, each jack comprising an expansible bellows containing a volatile substance adapted, when heated to a temperature below that of the exhaust to exert a pressure sufficient to raise the associated wheel, a manifold associated with said muffler and connected by independent pipes to the various jacks for supplying exhaust gases thereto, a set of valves in said manifold to control the flow of said gases and manual means to independently actuate said valves.

10. In a motor driven vehicle having running wheels and a high temperature exhaust including a muffler, a jack operatively associated with each wheel, each jack comprising an expansible bellows containing a volatile substance adapted, when heated to a temperature below that of the exhaust to exert a pressure sufficient to raise the associated wheel, a manifold associated with said muffler and connected by independent pipes to the various jacks for supplying exhaust gases thereto, a set of valves in said manifold to control the flow of said gases, manual means to independently actuate said valves, and automatic means associated with each jack to maintain the required temperature conditions while the selected valve is open.

11. In a motor driven vehicle having running wheels and a high temperature exhaust including a muffler, a jack operatively associated with each wheel, each jack comprising an expansible bellows containing a volatile substance adapted, when heated to a temperature below that of the exhaust to exert a pressure sufficient to raise the associated wheel, a manifold associated with said muffler and connected by independent pipes to the various jacks for supplying exhaust gases thereto, a set of valves in said manifold to control the flow of said gases, manual means to independently actuate said valves, a vent for the exhaust gases, associated with each of said jacks, and automatic thermal-controlled valve mechanism adapted to control said vent so as to maintain the required temperature in said jack during the operating period.

12. In combination, an expansible bellows containing a volatile substance, a second bellows forming a chamber in heat transfer relationship to said first bellows, and means for passing a heating fluid through said chamber.

13. In combination, an expansible bellows containing a volatile substance, a second bellows forming a chamber in heat transfer relationship to said first bellows, means for passing a heating fluid through said chamber, and means to control the passage of said fluid so as to maintain said first bellows at a predetermined temperature.

14. In combination, an expansible bellows containing a volatile substance, a second bellows forming a chamber in heat transfer relationship to said first bellows, means for passing a heating fluid through said chamber, and a vent for said chamber having a thermal responsive control valve adapted to regulate the flow of said fluid through said chamber.

15. An automobile jack and the like, comprising an expansible bellows containing a volatile substance adapted when heated to a high temperature to exert pressure sufficient for lifting the designated object, top and bottom plates secured to said bellows, the top plate being adapted to be secured to an automobile axle, the bottom plate being adapted to engage the ground for supporting purposes, a second flexible bellows secured to the top and bottom plates and forming a chamber around the bellows, means to supply a heating fluid to said chamber and a thermal controlled vent adapted to regulate the passage of said fluid through said chamber.

JAMES PYMM.